United States Patent
Fink et al.

(10) Patent No.: US 11,502,858 B2
(45) Date of Patent: Nov. 15, 2022

(54) PROVIDING REAL-WORLD TIME IN A REPLICATED STATE-MACHINE ENVIRONMENT

(71) Applicant: VMware, Inc., Palo Alto, CA (US)

(72) Inventors: Bryan Fink, San Jose, CA (US); Ittai Abraham, Tel Aviv (IL); Guy Golan Gueta, Holon (IL); Andrew Joseph Stone, Malden, MA (US)

(73) Assignee: VMWARE INC., Palo Alto, CA (US)

( * ) Notice: Subject to any disclaimer, the term of this patent is extended or adjusted under 35 U.S.C. 154(b) by 37 days.

(21) Appl. No.: 17/099,567

(22) Filed: Nov. 16, 2020

(65) Prior Publication Data

US 2021/0281433 A1 Sep. 9, 2021

Related U.S. Application Data

(60) Provisional application No. 62/987,145, filed on Mar. 9, 2020.

(51) Int. Cl.
| | |
|---|---|
| *H04L 29/06* | (2006.01) |
| *H04L 9/32* | (2006.01) |
| *H04J 3/06* | (2006.01) |
| *H04L 9/00* | (2022.01) |

(52) U.S. Cl.
CPC ............ *H04L 9/3297* (2013.01); *H04J 3/065* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 10,382,485 B2 * | 8/2019 | Won | H04W 4/70 |
| 10,402,374 B2 * | 9/2019 | Earl | G06F 11/1471 |
| 10,762,506 B1 * | 9/2020 | Cash | G06Q 20/206 |
| 10,887,082 B2 * | 1/2021 | Chamarajnager | H04L 63/123 |
| 11,197,075 B1 * | 12/2021 | Kamen | H04L 43/0817 |
| 2016/0210633 A1 * | 7/2016 | Epelman | G06Q 20/3224 |
| 2018/0293556 A1 * | 10/2018 | Hyun | G06Q 20/3678 |
| 2019/0215152 A1 * | 7/2019 | Wang | H04L 9/0894 |
| 2019/0215155 A1 * | 7/2019 | Wang | H04L 9/0861 |
| 2019/0253325 A1 * | 8/2019 | Coleman | H04L 41/0896 |
| 2019/0370486 A1 * | 12/2019 | Wang | H04L 9/50 |
| 2019/0377645 A1 * | 12/2019 | Abraham | G06F 11/183 |
| 2020/0012527 A1 * | 1/2020 | Hartsock | H04L 9/0825 |
| 2020/0166962 A1 * | 5/2020 | Ponceleon | G06F 1/14 |
| 2020/0394913 A1 * | 12/2020 | Reaser | G01C 21/3617 |
| 2021/0209483 A1 * | 7/2021 | Bose | H04L 67/104 |
| 2021/0263907 A1 * | 8/2021 | Krueger | H04L 9/3236 |
| 2021/0279255 A1 * | 9/2021 | Nayak | G06F 16/275 |

\* cited by examiner

*Primary Examiner* — Jeremy S Duffield
*Assistant Examiner* — Hassan A Hussein

(57) ABSTRACT

A blockchain network include nodes that are configured as time sources. These time-source nodes broadcast respective updates of their local times to all nodes in the blockchain network. Each node computes a summary time value based on the received local time values so that each node uses the same summary time to maintain their respective copies of the blockchain.

21 Claims, 7 Drawing Sheets

PROVIDING REAL-WORLD TIME IN A REPLICATED STATE-MACHINE ENVIRONMENT

CROSS REFERENCE TO RELATED APPLICATIONS

Pursuant to 35 U.S.C. § 119(e), this application is entitled to and claims the benefit of the filing date of U.S. Provisional App. No. 62/987,145 filed Mar. 9, 2020, the content of which is incorporated herein by reference in its entirety for all purposes.

BACKGROUND

It is common for smart contracts stored on a blockchain to express some logic based on time. For example, agreements often have start and end dates, outside of which the agreement no longer holds. Offers have expiries. Bills have due dates, and penalties are applied when they are exceeded. Time also helps with activities like auditing, where events on-chain need to be compared to events off-chain.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
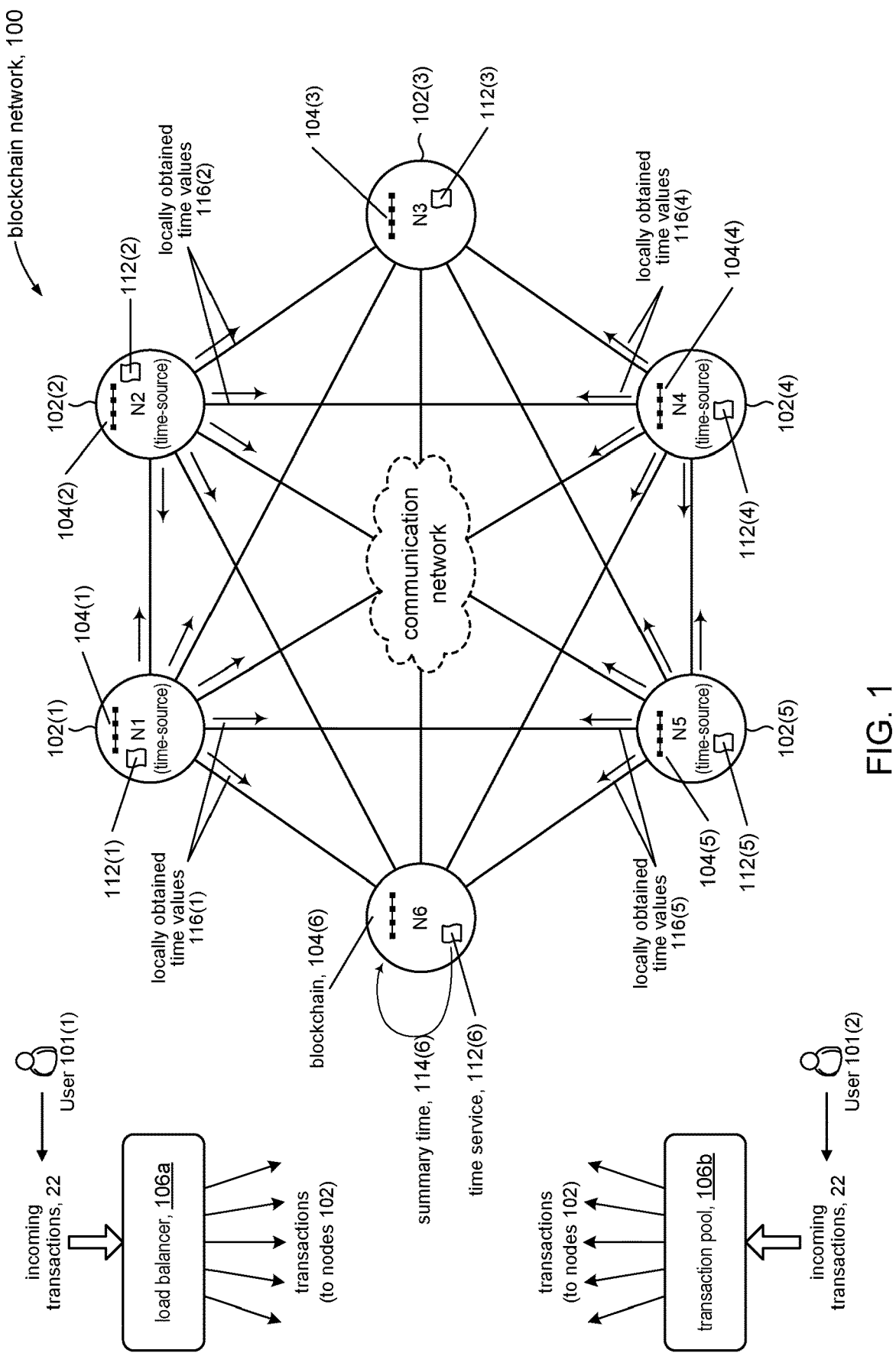
FIG. 1 shows an illustrative blockchain network to support a blockchain in accordance with the present disclosure.

FIG. 1 shows a system in accordance with the present disclosure. In some embodiments, the system can include blockchain network 100 comprising a set of nodes 102(1)-(6). Blockchain systems are known. The Bitcoin™ blockchain, for example, provides cryptocurrency services using blockchains. The Ethereum™ blockchain supports transactions of a more general nature and provides transaction services using blockchains. Blockchain network 100 implements a shared ledger referred to as a blockchain. In a blockchain network, the "blockchain" is represented in the network by storing a replica of the blockchain in each node comprising the network. In FIG. 1, for example, each blockchain 104 stored in each node 102 is a replica of the blockchain maintained by blockchain network 100. Nodes 102(1)-(6) can be interconnected by a communication network for communication with every other node in the blockchain network. Each node 102 executes identical instructions (algorithms) that dictate how to update its blockchain 104 with new transactions and how to determine whether those updates are valid.

Users 101(1)-(2) of blockchain network 100 submit transactions to the blockchain. In some embodiments, the blockchain network can include transaction load balancer 106a to distribute incoming transactions 22 among nodes 102(1)-(6) in the blockchain network; for example, in order to spread the processing load evenly across nodes 102(1)-(6). This configuration may be suitable in a private (permissioned) blockchain where the blockchain network can place restrictions on who is allowed to participate in the network and in what transactions.

In some embodiments, instead of transaction load balancer 106a, the system can include transaction pool 106b to store incoming transactions 22. Certain nodes in the blockchain network referred to as miner nodes (not shown) can select transactions from the transaction pool for inclusion in the blockchain. This configuration is suitable for a public (permissionless) blockchain (e.g., Bitcoin, Ethereum) where anyone can join the blockchain network, meaning that they can read, write, or participate with a public blockchain.

In accordance with the present disclosure, nodes 102(1)-(6) comprising blockchain network 100 can be configured as time-source nodes. Further in accordance with the present disclosure, each time-source node in blockchain network 100 can transmit a locally obtained time value (local time) 116 to all other nodes in the blockchain network. Respective time service 112 in each node computes a summary time, from the received local times, that the node can use for blockchain-related activities that involve knowing time. FIG. 1, for example, shows that time service 112(3) in node N3 produces summary time 114(3) that can be consumed by the node.

In some embodiments, less than all of the nodes comprising blockchain network 100 can be configured as time-source nodes. The configuration in FIG. 1, for instance, shows that only a subset of nodes 102(1)-(6) are configured as time-source nodes, namely nodes N1, N2, N4, and N5. In other embodiments, however, every node in the blockchain network can be configured as a time-source node. As explained below, a blockchain network with a larger number of time-source nodes can tolerate faulty nodes better than a blockchain network with a smaller number of time-source nodes. On the other hand, the larger the number of time-source nodes the greater will be the loading on the communication network.

Figure 2:
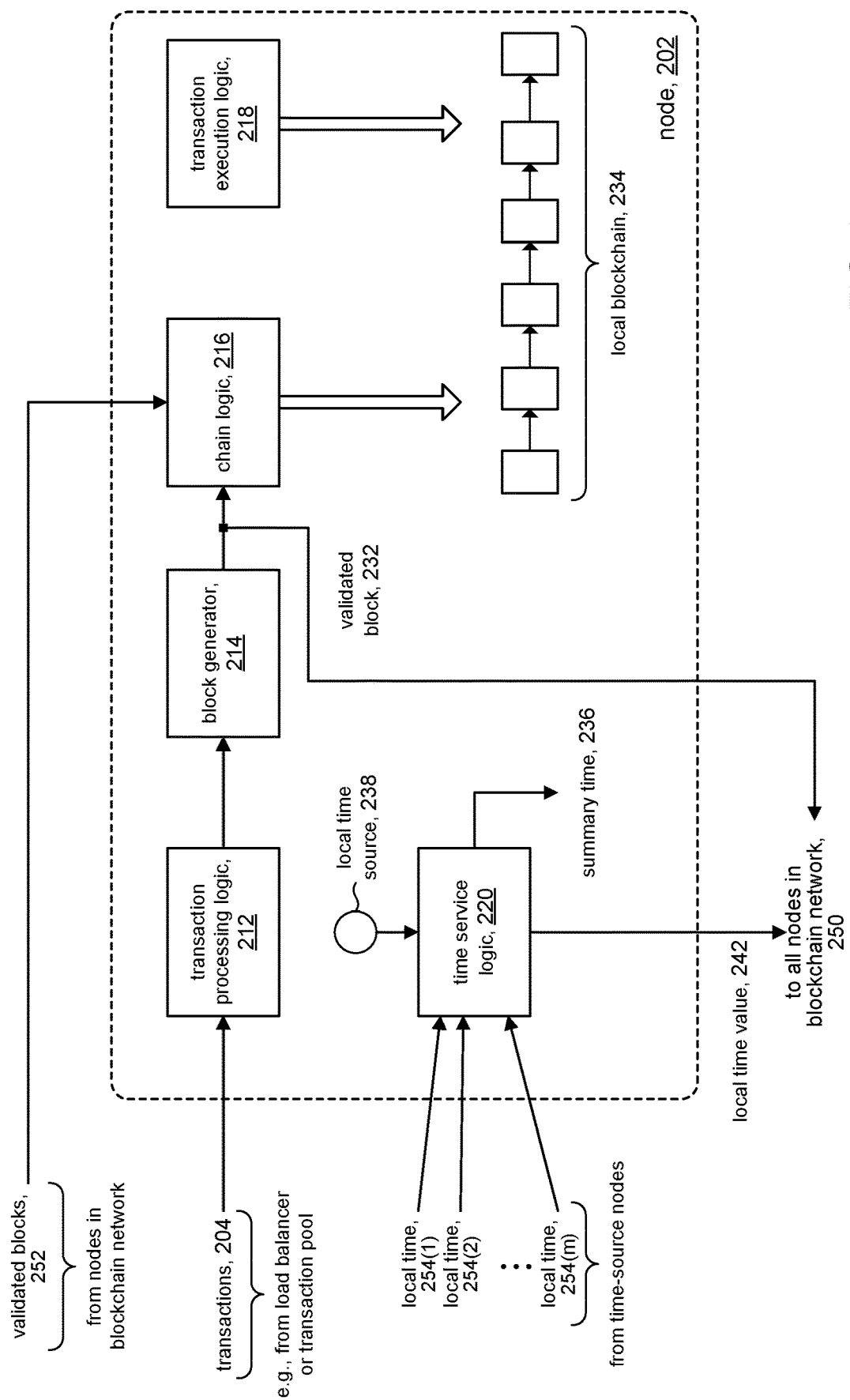
FIG. 2 shows details of an illustrative blockchain node in a blockchain network in accordance with the present disclosure.

Referring to FIG. 2, additional detail of nodes 102(1)-(6) in blockchain network 100 are discussed. Node 202 in FIG. 2 is representative of each node 102 in FIG. 1 and shows details in accordance with some embodiments. In some embodiments, for example, node 202 can include transaction processing logic 212 to process received transactions 204. The transaction processing logic can verify transactions before they are added to blockchain 234. In some embodiments, for example, a client that submits transactions (e.g., 22) may digitally sign their transactions, e.g., using public-private key encryption. Transaction processing logic can verify the digital signature of a received transaction before allowing further processing on the transaction. Transaction processing logic 212 can pass transactions to block generator 214 to initiate generating a block. In some embodiments, for example, the trigger for generating a block can be the accumulation of some number of transactions. It will be appreciated that other criteria can be used to trigger generating a block.

Block generator 214 produces validated block 232 from one or more received transactions provided by the transaction processing logic. Block generator 214 can then provide validated block 232 to chain logic 214, and also broadcast (publish) the validated block to all other nodes in the blockchain network 250.

Chain logic 216 can add validated block 232 to local blockchain 234. The cooperation of block generator 214 and chain logic 216 in each node in the blockchain network provides the mechanism by which the blockchain is replicated among all nodes in the blockchain network 250. The block generator in each node broadcasts validated blocks to all other nodes in the blockchain network, while the chain logic in each node adds validated blocks 252, received from all other nodes in the blockchain network, to its local copy of the blockchain.

Node 202 can include transaction execution logic 218 to execute transactions contained in a block on blockchain 234. For example, transactions in the Ethereum™ blockchain system can comprise executable program code referred to as "smart contracts." The transaction execution logic in an Ethereum™ node can instantiate a virtual machine (Ethereum VM) to execute smart contracts. In some embodiments, transaction execution logic 218 can execute transactions at the time that the block is added to blockchain 234.

Node 202 can include time service logic 220 to provide summary time 236 that can then be used by other components in the node as a time reference. A time reference is used in many ways in the blockchain. In some embodiments, for example, when a transaction is added to a new block on the chain, the time that the block was added is stamped on it, as the "record time." When a client application submits a transaction to the blockchain, it may be labelled with a "ledger effective time" to specify the earliest time the transaction can be allowed onto the blockchain and/or a "max record time" to specify the latest time the transaction can be allowed onto the blockchain. The time reference can be used to record the time when a block is mined (Bitcoin, Ethereum). A time reference may be used during the execution of smart contracts, for instance, to determine start and end dates, offer expiration times, due dates, and so on.

Time service logic 220 can receive local time values 254(1)-(m) from nodes in the blockchain network that are configured as time-source nodes and compute or otherwise generate summary time 236 based on the received local time values. When node 202 is configured as a time-source node, time service logic 220 can obtain its local time from local time source 238 and publish the obtained local time as local time value 242 to all other nodes in the blockchain network. These aspects of the present disclosure are discussed below.

Figure 3:
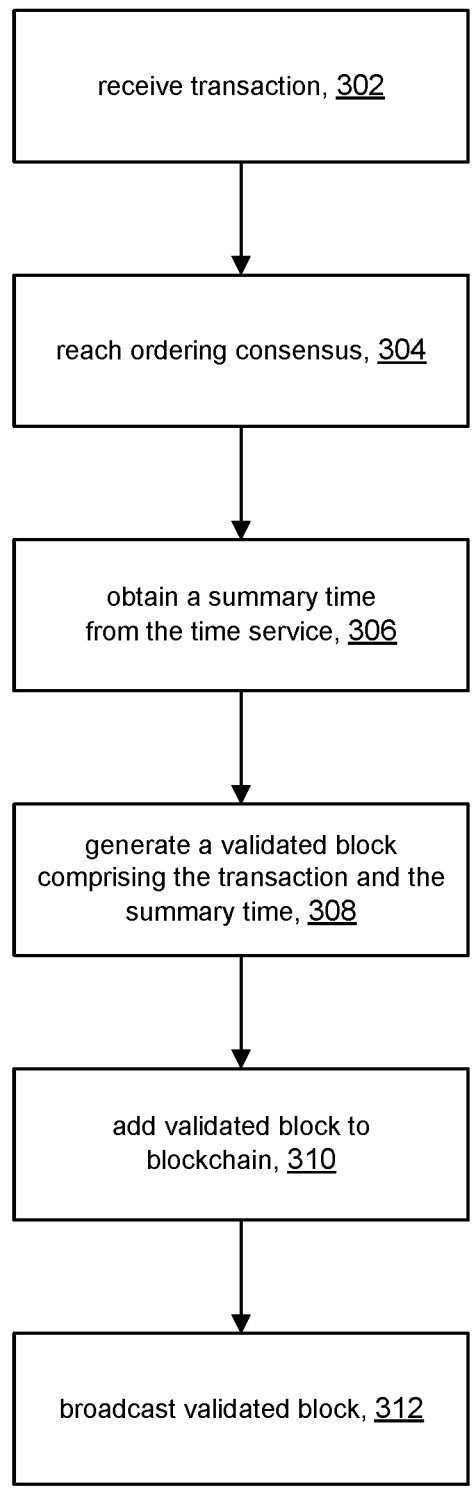
FIG. 3 shows a flow of operations to add a block to a blockchain in accordance with the present disclosure.
Figure 4:
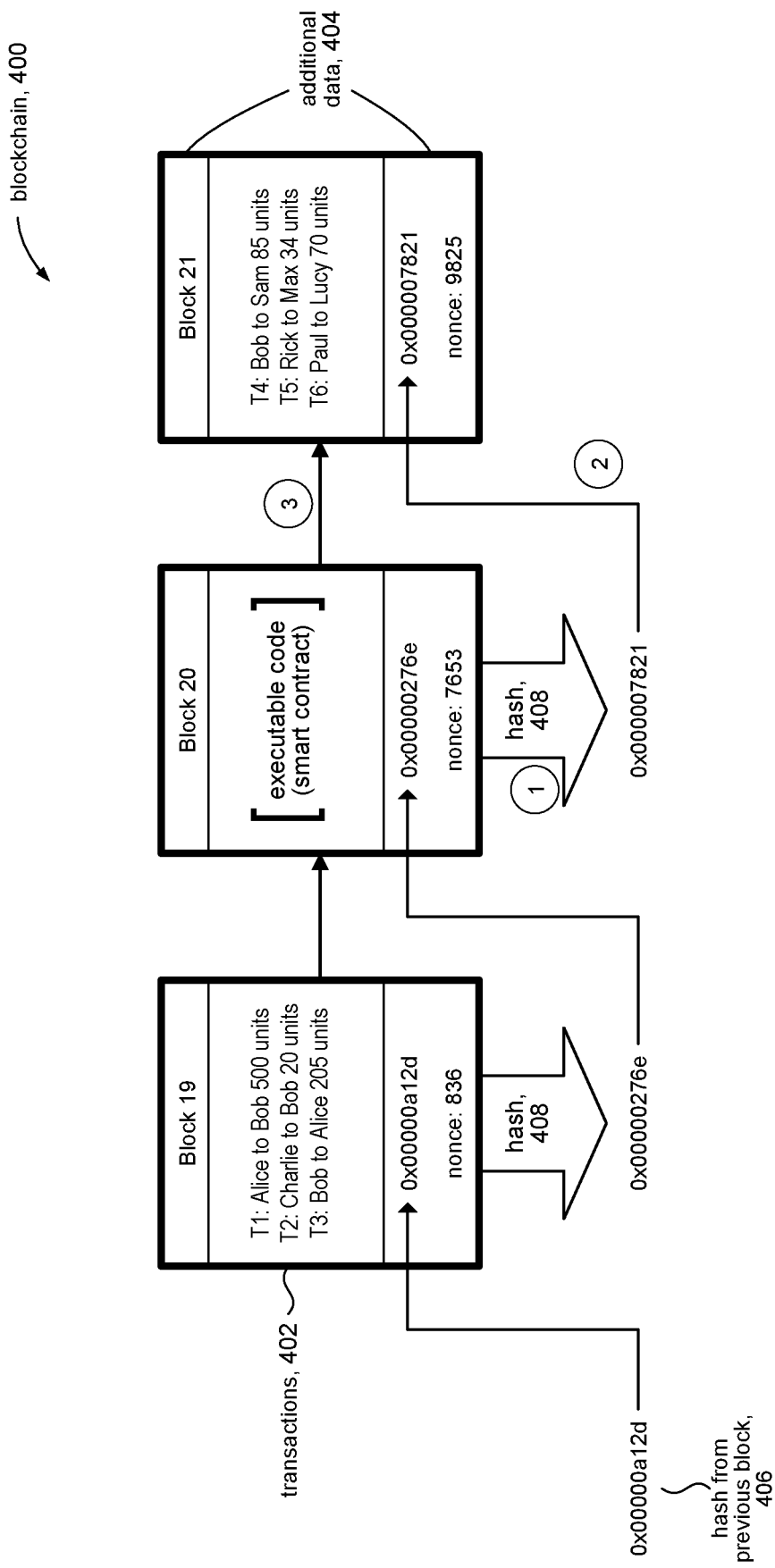
FIG. 4 shows a flow of operations to manage time in accordance with the present disclosure.

Referring to FIGS. 3 and 4, the discussion will now turn to a high level description of operations and processing in a blockchain node (e.g., 202) in a blockchain network to process transactions in accordance with the present disclosure. In some embodiments, for example, the blockchain node can include computer executable program code, which when executed by a processor (e.g., 702, FIG. 7) in the blockchain node, can cause the node to perform processing in accordance with FIG. 3. The operations described below are not necessarily executed in the order shown, and can be allocated for execution among one or more concurrently executing processes and/or threads.

At operation 302, the blockchain node can receive one or more transactions for inclusion in a block. As noted above, in some embodiments, transactions can be provided to the blockchain node via a transaction load balancer (e.g., 106a, FIG. 1). In other embodiments, transactions can be obtained from a transaction pool (e.g., 106b, FIG. 1); e.g., the blockchain node can select which transactions in the transaction pool to process.

At operation 304, the blockchain node can reach consensus among the other nodes in the blockchain network to establish the order in which to add transactions to the blockchain.

At operation 306, the blockchain node can obtain a summary time from a time service (e.g., time service logic 220) executing on the blockchain node. When the time service is accessed to obtain a summary time, the time service can compute the summary time from the set of local time values received from nodes in the blockchain network that are configured as time sources. In various embodiments, some (or all) nodes in the blockchain network are configured as time-source nodes. Time-source nodes transmit their local times to all other nodes in the blockchain network. Referring to FIG. 1 for example, nodes N1, N2, N4, and N5 are depicted as having been configured as time-source nodes. Each time-source node transmits its local time to all other nodes in the network. For example, node N1 transmits its local time to all nodes (N1-N6), node N2 transmits its local time to all nodes, and so on. Each node in the blockchain network receives the same set of local time values from the same time-source nodes. Accordingly, at any given point in time, each node will generate the same summary time.

At operation 308, the blockchain node can generate a validated block from the received transactions. Algorithms for generating validated blocks are known, and the details of an algorithm depend on the blockchain network. In the Bitcoin™ blockchain, for instance, a block comprises several transactions along with other additional data, including a datum referred to as a nonce. A validated Bitcoin™ block is characterized by having a hash value with a certain characteristic; e.g., the hash value begins with 5 zeroes. Generating a validated block for the Bitcoin™ blockchain involves finding a nonce value for the block that produces such a hash value when the block is hashed.

At operation 310, the blockchain node can add the validated block to the blockchain. The general process of adding a block to a blockchain is known. Briefly, however, consider the example in FIG. 4 which illustrates the addition of Block 21 to blockchain 400. Block 21 can be added to blockchain 400 by computing a hash value from the contents of the last block (Block 20) in the blockchain using a hash function 408, such as the SHA-1 hash algorithm; this step is depicted in FIG. 4 by the circled number '1'. The content of a block includes transaction data 402 and additional data 404. As explained above, a nonce value can be incorporated into block 20 as additional data 404 so that the computed hash value exhibits a predefined characteristic, which in our example is a number having five leading zeroes. The resulting hash value is incorporated into the additional data 404 of Block 21 (see circle '2'). A pointer can be added to Block 20 to point to newly added Block 21 (circle '3'). The process can be repeated when another new block is added to blockchain 400.

Returning to FIG. 3, at operation 312, the blockchain node can broadcast the validated block generated at operation 308 to all other nodes in the blockchain network. This allows for the blockchain to be replicated among all the nodes in the blockchain network.

Figure 5:
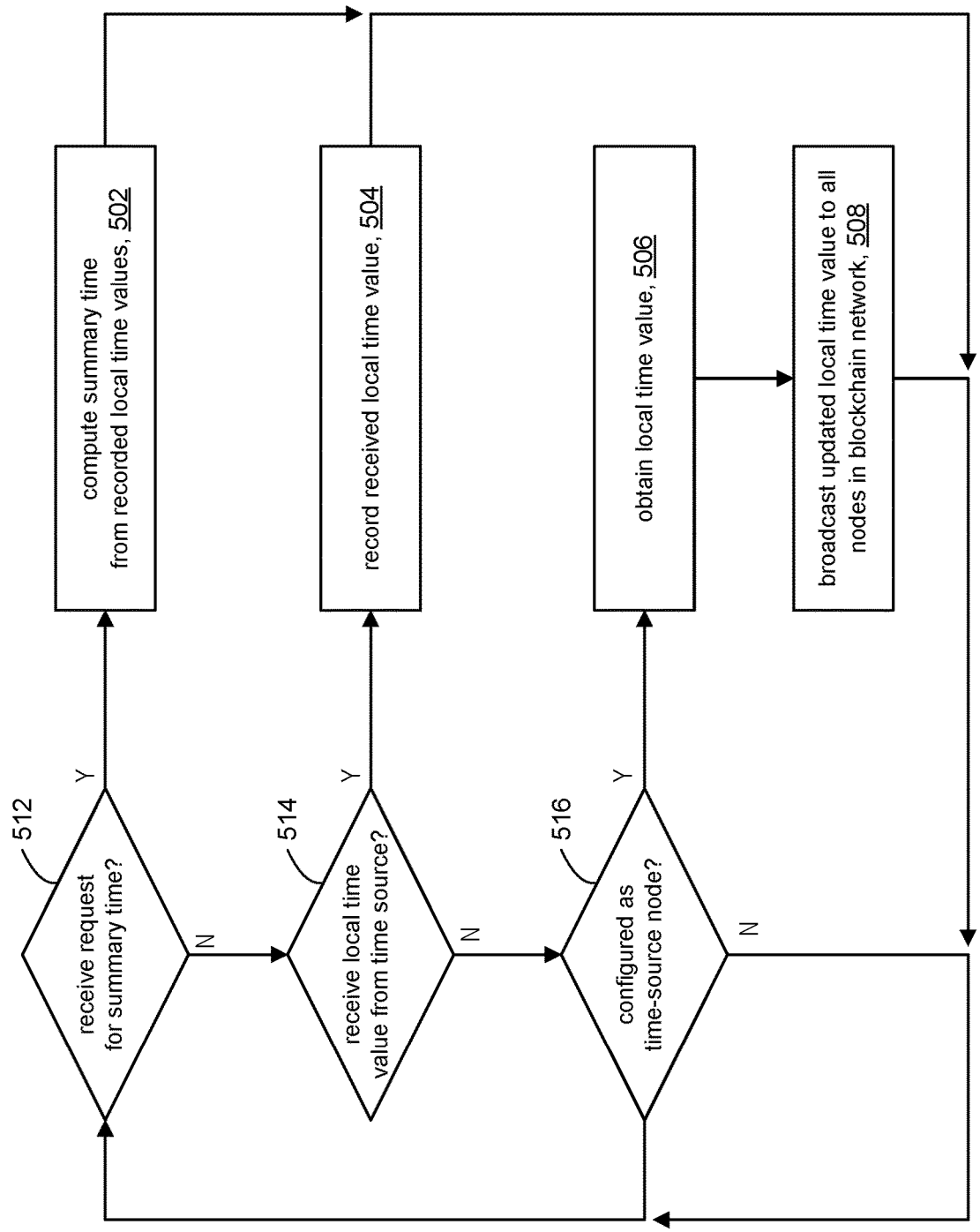
FIG. 5 shows an illustrative computing system adapted in accordance with the present disclosure.

Referring to FIG. 5, the discussion will now turn to a high level description of operations and processing by the time service (e.g., 220) executing in a blockchain node to provide a summary time in accordance with the present disclosure. In some embodiments, for example, the blockchain node can include computer executable program code, which when executed by a processor (e.g., 702, FIG. 7) in the blockchain node, can cause the node to perform processing in accordance with FIG. 5. The operations described below are not necessarily executed in the order shown, and can be allocated for execution among one or more concurrently executing processes and/or threads.

At decision point 512, the time service can proceed to operation 502 if the time service receives a request for a summary time; otherwise, the time service can proceed to decision point 514. In some embodiments, the request for a summary time can be viewed as the execution of a smart time contract (see operation 504 below). The request can be initiated by logic that generates the next block in the blockchain, by contract-specific logic that needs to know the time, and so on. The request invokes local execution of the time contract to obtain the summary time.

At operation 502, the time service can compute a summary time from recorded local time values received from other time-source nodes in the blockchain network. In some embodiments, for example, the time service can take the median value of all the received local time values. In other embodiments, the f highest time values and f lowest time values can be ignored and the median value of the remaining local time values can serve as the summary time. It will be appreciated that in general any deterministic function that ignores the f highest and f lowest time values can be used. Computing the summary time from this window of time values reduces the risk of a corrupted summary time in the presence of f or fewer corrupted time sources. This time summarization process is illustrated by an example shown in FIG. 6 and described below.

At decision point 514, the time service can proceed to operation 504 if the time service receives a local time value from a time-source node; otherwise, the time service can proceed to decision point 516.

At operation 504, the time service can record a local time value received from a node in the blockchain network configured as a time source. In some embodiments, time values are transmitted as a time update transaction (2-tuple message) comprising (1) a source identifier that identifies the source of time value and (2) the local time value itself. In some embodiments, the time update transaction can be digitally signed by the source (e.g., using public/private key encryption) so that the receiving node can verify the received transaction. The time service can include a built-in smart time contract that executes the time update transaction. In some embodiments, the built-in smart contract can record the received local time value, for example, in a table indexed by the source identifier. In accordance with the present disclosure, the received time value will be ignored if it is equal to or less than (prior in time) the currently recorded time value for that source. Otherwise, the received local time value will overwrite the currently recorded time value received from that source. This prevents delayed messages from the source from confusing the time service, ensuring that only the most recent message is recorded.

At decision point 516, the time service can proceed to operation 506 if the blockchain node that the time service is executing on is configured as a time source; otherwise, processing can return to decision point 512. Recall from above that every node in the blockchain network receives local time values from time source nodes so that that every node in the blockchain network can compute the same summary time. However, not all nodes are necessarily configured as time sources.

At operation 506, the time service (operating as a time source) can obtain a time value that is local to the blockchain node that the time service is executing on. In some embodiments, for example, the time service can read time from a local time source (e.g., 238) such as the system clock. In other embodiments, the local time source can be a system call to read time from an on-board global positioning system (GPS) module. It will be appreciated that the local time source can be any suitable source of local time.

At operation 508, the time service can broadcast (publish) an updated value of its local time to all nodes in the blockchain network by transmitting a time update transaction to all nodes in the blockchain network. In some embodiments, for example, the time service can append a time update transaction to a user transaction (e.g., a write operation), so that when the user transaction is broadcast to all nodes in the blockchain network the time update transaction will go also be broadcast to all nodes in the blockchain. This piggy-backing of a time update transaction with a user transaction that is going to be transmitted to all nodes to begin with avoids the overhead of sending separate time update transactions. However, to prevent low-load conditions from stopping time due to insufficient time updates, the time service can broadcast the local time value in separate time update transactions. For example, an idle timer can be used to guarantee that the local time value is broadcast to all nodes at some interval, even under low loads. Because the time updates are broadcast as transactions, time update transactions are treated exactly like user transactions, in that they undergo ordering, and the results of their processing are stored on-chain. Accordingly, when a time summary is requested, the summary is computed using the agreed upon state of the world at a particular block.

Figure 6:
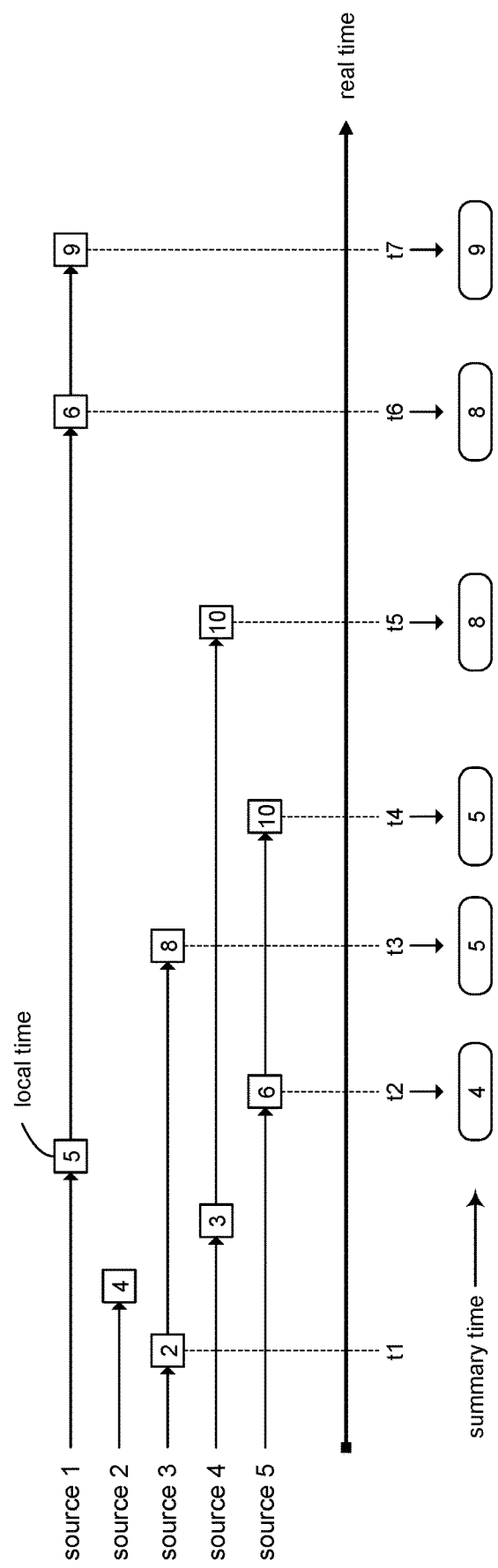
FIG. 6 illustrate time summarization in accordance with the present disclosure.

FIG. 6 shows an example of the time summarization process in accordance with some embodiments. The example shows five time-source nodes, with each node broadcasting its respective local time value to all other nodes in the blockchain network. A timeline represents real-world time. FIG. 6 shows that source 1 to source 5 broadcast their respective local time values to all nodes in the blockchain network between time t1 and time t2; i.e., source 1 broadcasts a local time of 5 to all nodes, source 2 broadcasts a local time of 4, source 3 a local time of 2, and so on. It can be see that the present disclosure does not impose any coordination on when the time-source nodes broadcast their respective local time values. Time-source nodes can broadcast updates of their local time values periodically or at irregular intervals. Source 1, for example, is shown broadcasting its updates at uneven intervals at times.

At time t2 all nodes in the blockchain network will have received a local time value from each of the time-source nodes. The time service in a given node in the blockchain network can generate a summary time based on the received local times. As explained above, the time service can be accessed or otherwise invoked to provide a summary time during transaction processing. The recorded local time values at time t2 are (in sorted order): 2, 4, 3, 5, 6. As noted above, in some embodiments, the summary time can be obtained by dropping the f highest and f lowest values and taking the median, where f represents a maximum number of failed or corrupt time sources. Suppose for discussion purposes, f=1. The summary time at time t2 can be obtained by each node in the blockchain network as follows:

recorded/sorted time values: {2, 3, 4, 5, 6}
        remove f highest and f lowest: {3, 4, 5}
            summary time: 4

Accordingly, at time t2, each node in the blockchain network will receive the same summary time=4 as the time value when they need a time reference.

The summary time is updated by the nodes in the blockchain network each time a updated local time value is broadcast by a time-source and received. For example, suppose at time t3 time source 3 broadcasts an updated local time value of 8. The newly received time value for source 3 (time=8) is compared against the currently recorded time value for source 3 (time=2). Since the newly received time value is greater than the currently recorded time value, the newly received time value is recorded against source 3. The summary time at time t3 can be obtained as follows:

recorded/sorted time values: {3, 4, 5, 6, 8}
        remove f highest and f lowest: {4, 5, 6}
            summary time: 5

Now, at time t3, each node in the blockchain network will receive the same summary time=5 as the time value when they need a time reference.

At time t4, source 5 broadcasts an updated local time value of 10, which replaces the currently recorded time value of 6 for source 5. The summary time is updated as follows:

recorded/sorted time values: {3, 4, 5, 8, 10}
        remove f highest and f lowest: {4, 5, 8}
            summary time: 5

It can be appreciated from the foregoing that the summary time is independent of the real time. However, the summary time has properties of the real time in that the summary time always moves forward and not backward because local time value updates from the time-source nodes are verified. As such, the present disclosure can provide a summary time that can serve as a suitable time reference for the various processes in a blockchain network. The local time values from which the summary time is obtained or otherwise computed come from nodes comprising the blockchain network, and so the obtained summary time is deterministic. The summary time on the blockchain is supported by several time sources so it is reliable; there is no single point of failure, the summary time can tolerate up to f failed (corrupted) time sources.

By comparison, conventional methods for obtaining a time reference include each node obtaining the real time from its system clock. In order to synchronize the system clocks among the nodes in the blockchain network can involve complicated and expensive techniques. Network time protocol (NTP), precision time protocol (PTP), and/or GPS deployments can usually keep system clocks within milliseconds of each other. Unfortunately, correct configuration of NTP is notoriously hard, PTP requires special hardware, and even Google's deployment of GPS for their Spanner service often sees skews of hundreds of milliseconds.

Another conventional solution, for example, is to have each node access a central time server for the current time. Unfortunately, this does not solve the problem, because of the asynchrony of those requests. If submitter A reads time t, and submitter B reads time t+1, but B's transaction gets ordered before A's, time will appear to flow backward. In addition, the time at which each validator receives the transaction may also vary widely, especially when catching up after being disconnected. While at first this just sounds annoying, in fact it means that the validators are not deterministic, which violates the requirements of scalable byzantine fault tolerant (SBFT) state machines. SBFT requires that validator decisions are deterministic. If it is ever possible for two validators to make different decisions because their executions read times on either side of a threshold, execution is no longer deterministic, and SBFT will become stuck.

Yet another conventional solution is to have some GPS clock publish its time on the blockchain. However, the single GPS clock represents a single point of failure and introduces fragility in the system. If that clock is configured incorrectly or otherwise publishes the wrong time for any reason, the entire system is misled on the current real-world time. If the clock goes offline, time stops for the entire system.

Figure 7:
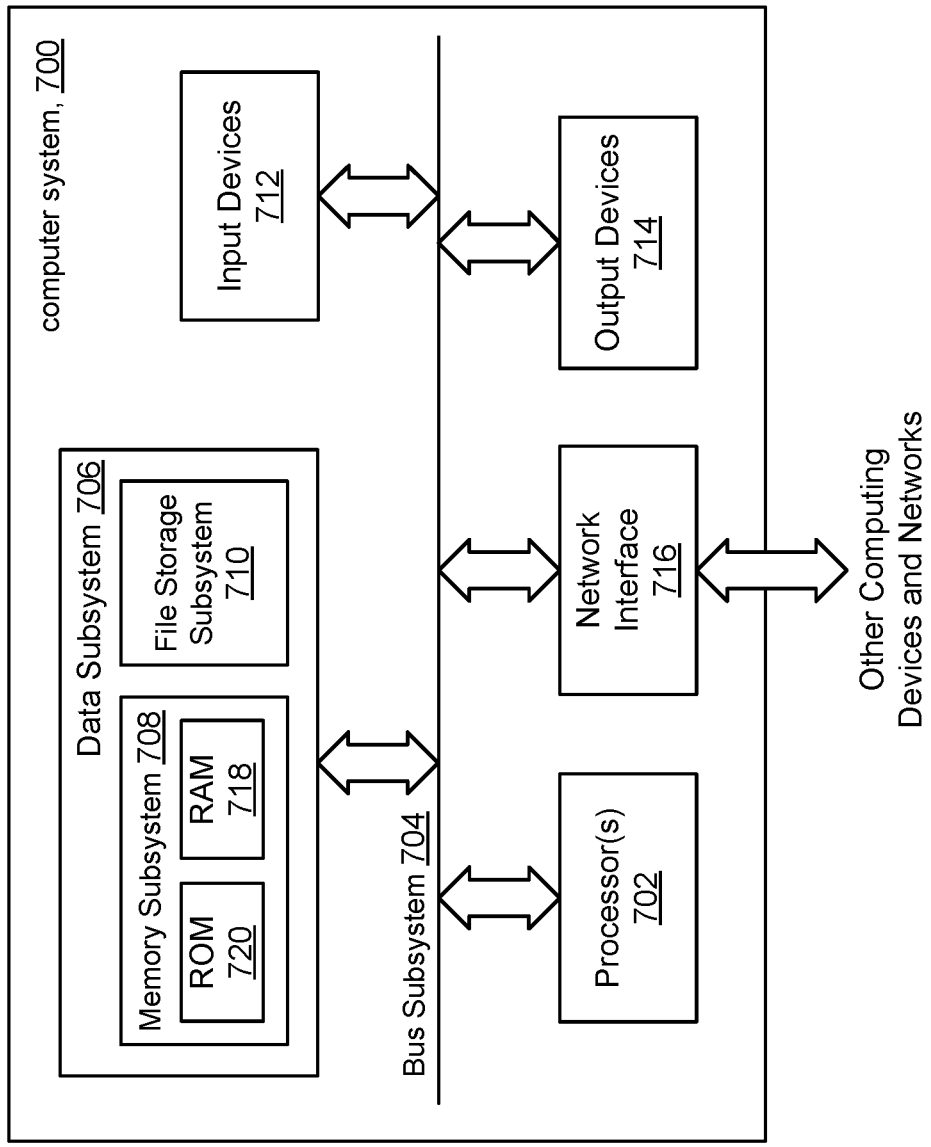
FIG. 7 illustrates a computer system adapted in accordance with the present disclosure.

FIG. 7 depicts a simplified block diagram of an example computer system 700 according to certain embodiments. Computer system 700 can be used to implement nodes in the blockchain network described in the present disclosure. As shown in FIG. 7, computer system 700 includes one or more processors 702 that communicate with a number of peripheral devices via bus subsystem 704. These peripheral devices include data subsystem 706 (comprising memory subsystem 708 and file storage subsystem 710), user interface input devices 712, user interface output devices 714, and network interface subsystem 716.

Bus subsystem 704 can provide a mechanism that enables the various components and subsystems of computer system 700 to communicate with each other as intended. Although bus subsystem 704 is shown schematically as a single bus, alternative embodiments of the bus subsystem can utilize multiple busses.

Network interface subsystem 716 can serve as an interface for communicating data between computer system 700 and other computer systems or networks; e.g., other nodes in the blockchain network. Embodiments of network interface subsystem 716 can include, e.g., an Ethernet card, a Wi-Fi and/or cellular adapter, digital subscriber line (DSL) units, and/or the like.

User interface input devices 712 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 700.

User interface output devices 714 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 700.

Data subsystem 706 includes memory subsystem 708 and file/disk storage subsystem 710 represent non-transitory computer-readable storage media that can store program code and/or data, which when executed by processor 702, can cause processor 702 to perform operations in accordance with embodiments of the present disclosure.

Memory subsystem 708 includes a number of memories including main random access memory (RAM) 718 for storage of instructions and data during program execution and read-only memory (ROM) 720 in which fixed instructions are stored. File storage subsystem 710 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 700 is illustrative and many other configurations having more or fewer components than system 700 are possible.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method comprising:
a given node among a plurality of nodes comprising a blockchain network receiving a transaction to be added to a blockchain stored on the given node;
the given node receiving a plurality of time update transactions from a plurality of time-source nodes among the plurality of nodes comprising the blockchain network, each time update transaction including an identifier of a time-source node that transmitted the time update transaction and a time value obtained by the time-source node from a local time source;
the given node processing said each time update transaction by:
checking whether the time value included in said each time update transaction is less than or equal to a prior time value received from the time-source node that sent said each time update transaction, the prior time value being recorded in a table maintained by the given node and being indexed in the table by the identifier of the time-source node;
upon determining that the time value is less than or equal to the prior time value, ignoring the time value; and
upon determining that the time value is greater than the prior time value, overwriting the prior time value in the table with the time value;
the given node computing a summary time from a plurality of time values recorded in the table, the computing comprising:
removing a number of highest and lowest time values in the plurality of time values, the removing resulting in a set of resulting time values; and
computing a median of the set of resulting time values;
the given node generating a block that includes the transaction and the computed summary time; and
the given node adding the generated block to the blockchain,
wherein the plurality of time-source nodes send the plurality of time update transactions to each of the plurality of nodes comprising the blockchain network so that each of the plurality of nodes comprising the blockchain network computes and uses the same computed summary time.

2. The method of claim 1, further comprising the given node reaching ordering consensus with other nodes in the blockchain network to determine an insertion order of transactions into the blockchain network.

3. The method of claim 1, further comprising the given node broadcasting the generated block to the plurality of nodes comprising the blockchain network.

4. The method of claim 1, wherein each node comprising the blockchain network is configured as a time-source node.

5. The method of claim 1, wherein the given node is a time-source node, the method further comprising the given node obtaining a local time value and transmitting a time update transaction including the local time value to each of the plurality of nodes comprising the blockchain network.

6. The method of claim 5, wherein the local time value is obtained from a system clock of the given node.

7. The method of claim 1, further comprising the given node executing a smart contract on the blockchain and updating a state of the smart contract, wherein executing the smart contract includes reading the computed summary time.

8. The method of claim 1, wherein at least a subset of the plurality of time update transactions are appended to user transactions transmitted by the plurality of time-source nodes.

9. A non-transitory computer-readable storage medium having stored thereon computer executable instructions, which when executed by a computer device in a given node among a plurality of nodes comprising a blockchain network, cause the computer device to:
receive a transaction to be added to a blockchain stored on the given node;
receive a plurality of time update transactions from a plurality of time-source nodes among the plurality of nodes comprising the blockchain network, each time update transaction including an identifier of a time-source node that transmitted the time update transaction and a time value obtained by the time-source node from a local time source;
process said each time update transaction by:
checking whether the time value included in said each time update transaction is less than or equal to a prior time value received from the time-source node that sent said each time update transaction, the prior time value being recorded in a table maintained by the given node and being indexed in the table by the identifier of the time-source node;
upon determining that the time value is less than or equal to the prior time value, ignoring the time value; and
upon determining that the time value is greater than the prior time value, overwriting the prior time value in the table with the time value;

compute a summary time from a plurality of time values recorded in the table, the computing comprising:
  removing a number of highest and lowest time values in the plurality of time values, the removing resulting in a set of resulting time values; and
  computing a median of the set of resulting time values;
generate a block that includes the transaction and the computed summary time; and
add the generated block to the blockchain,
wherein the plurality of time-source nodes send the plurality of time update transactions to each of the plurality of nodes comprising the blockchain network so that each of the plurality of nodes comprising the blockchain network computes and uses the same computed summary time.

10. The non-transitory computer-readable storage medium of claim 9, wherein the computer executable instructions, which when executed by the computer device in the given node, further cause the computer device to broadcast the generated block to the plurality of nodes comprising the blockchain network.

11. The non-transitory computer-readable storage medium of claim 9, wherein each node comprising the blockchain network is configured as a time-source node.

12. The non-transitory computer-readable storage medium of claim 9, wherein the given node is a time-source node, the method further comprising the given node obtaining a local time value and transmitting a time update transaction including the local time value to each of the plurality of nodes comprising the blockchain network.

13. The non-transitory computer-readable storage medium of claim 12, wherein the local time value is obtained from a system clock of the given node.

14. The non-transitory computer-readable storage medium of claim 9, wherein the computer executable instructions, which when executed by the computer device in the given node, further cause the computer device to execute a smart contract on the blockchain and updating a state of the smart contract, wherein executing the smart contract includes reading the computed summary time.

15. The non-transitory computer-readable storage medium of claim 9, wherein at least a subset of the plurality of time update transactions are appended to user transactions transmitted by the plurality of time-source nodes.

16. A computing node (apparatus) among a plurality of nodes comprising a blockchain network, the computing node comprising:
  one or more computer processors; and
  a non-transitory computer-readable storage medium comprising instructions for controlling the one or more computer processors to:
  receive a transaction to be added to a blockchain stored on the given node;
  receive a plurality of time update transactions from a plurality of time-source nodes among the plurality of nodes comprising the blockchain network, each time update transaction including an identifier of a time-source node that transmitted the time update transaction and a time value obtained by the time-source node from a local time source;
  process said each time update transaction by:
    checking whether the time value included in said each time update transaction is less than or equal to a prior time value received from the time-source node that sent said each time update transaction, the prior time value being recorded in a table maintained by the given node and being indexed in the table by the identifier of the time-source node;
    upon determining that the time value is less than or equal to the prior time value, ignoring the time value; and
    upon determining that the time value is greater than the prior time value, overwriting the prior time value in the table with the time value;
  compute a summary time from a plurality of time values recorded in the table, the computing comprising:
    removing a number of highest and lowest time values in the plurality of time values, the removing resulting in a set of resulting time values; and
    computing a median of the set of resulting time values;
  generate a block that includes the transaction and the computed summary time; and
  add the generated block to the blockchain,
  wherein the plurality of time-source nodes send the plurality of time update transactions to each of the plurality of nodes comprising the blockchain network so that each of the plurality of nodes comprising the blockchain network computes and uses the same computed summary time.

17. The apparatus of claim 16, wherein the computer-readable storage medium further comprises instructions for controlling the one or more computer processors to broadcast the generated block to the plurality of nodes comprising the blockchain network.

18. The apparatus of claim 16, wherein each node comprising the blockchain network is configured as a time-source node.

19. The apparatus of claim 16, wherein the given node is a time-source node, the method further comprising the given node obtaining a local time value and transmitting a time update transaction including the local time value to each of the plurality of nodes comprising the blockchain network.

20. The apparatus of claim 16, wherein the computer-readable storage medium further comprises instructions for controlling the one or more computer processors to execute a smart contract on the blockchain and updating a state of the smart contract, wherein executing the smart contract includes reading the computed summary time.

21. The apparatus of claim 16, wherein at least a subset of the plurality of time update transactions are appended to user transactions transmitted by the plurality of time-source nodes.

* * * * *